(12) United States Patent
Sun

(10) Patent No.: US 9,148,882 B2
(45) Date of Patent: *Sep. 29, 2015

(54) METHOD FOR PROCESSING DATA ASSOCIATED WITH SESSION MANAGEMENT AND MOBILITY MANAGEMENT

(71) Applicant: LG ELECTRONICS INC., Seoul (KR)

(72) Inventor: Li-Hsiang Sun, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.
This patent is subject to a terminal disclaimer.

(21) Appl. No.: 14/444,755

(22) Filed: Jul. 28, 2014

(65) Prior Publication Data

US 2014/0334427 A1 Nov. 13, 2014

Related U.S. Application Data

(63) Continuation of application No. 13/458,427, filed on Apr. 27, 2012, now Pat. No. 8,837,408.

(60) Provisional application No. 61/481,082, filed on Apr. 29, 2011.

(30) Foreign Application Priority Data

Apr. 27, 2012 (WO) ................ PCT/KR2012/003274

(51) Int. Cl.
*H04W 4/00* (2009.01)
*H04W 72/04* (2009.01)
*H04L 29/08* (2006.01)
*H04W 28/02* (2009.01)
*H04W 76/02* (2009.01)

(52) U.S. Cl.
CPC ........... *H04W 72/042* (2013.01); *H04L 67/143* (2013.01); *H04W 28/0289* (2013.01); *H04W 72/04* (2013.01); *H04W 76/027* (2013.01)

(58) Field of Classification Search
CPC .................................................. H04W 72/042
USPC ......................................................... 370/329
See application file for complete search history.

(56) References Cited

U.S. PATENT DOCUMENTS

| 8,351,378 | B2 * | 1/2013 | Wang et al. ................... 370/328 |
| 8,520,593 | B2 * | 8/2013 | Guo et al. ..................... 370/328 |
| 8,837,408 | B2 * | 9/2014 | Sun ............................... 370/329 |
| 2010/0309859 | A1 | 12/2010 | Shin et al. |
| 2011/0019644 | A1 | 1/2011 | Cheon et al. |

FOREIGN PATENT DOCUMENTS

WO WO 2008/125729 A1 10/2008
WO WO 2010/062093 A2 6/2010

OTHER PUBLICATIONS

3GPP TS 24.301 v10.0.0, "3rd Generation Partnership Project; Technical Specification Group Core Network and Terminals; Non-Access-Stratum (NAS) protocol for Evolved Packet System (EPS); Stage 3 (Release 10)", LTE Advance, pp. 163-167, Sep. 2010.
3GPP TS 24.301 v10.0.0, "3rd Generation Partnership Project Technical Specification Group Core Network and Terminals; Non-Access-Stratum (NAS) protocol for Evolved Packet System (EPS); Stage 3 (Release 10)", LTE Advance, pp. 159-162, Sep. 2010.

* cited by examiner

*Primary Examiner* — Wei Zhao
(74) *Attorney, Agent, or Firm* — Birch, Stewart, Kolasch & Birch, LLP

(57) ABSTRACT

A user equipment (UE) in a communication system, and a method thereof. The method includes establishing; by a user equipment (UE), a first data connection associated with an access point name (APN); receiving, by the UE, a session management back-off time value when a request of a bearer resource modification or a bearer resource allocation for the established first data connection is rejected; starting, by the UE, a session management back-off timer according to the session management back-off time value, the session management back-off timer being associated with the established first data connection; if the UE receives a deactivate bearer context request message indicating that reactivation is requested, stopping the session management back-off timer if the session management back-off timer is running; and establishing, by the UE, a second data connection associated with the APN after stopping the session management back-off timer.

12 Claims, 7 Drawing Sheets

METHOD FOR PROCESSING DATA ASSOCIATED WITH SESSION MANAGEMENT AND MOBILITY MANAGEMENT

CROSS-REFERENCE TO RELATED APPLICATIONS

This application is a continuation of co-pending U.S. patent application Ser. No. 13/458,427 filed Apr. 27, 2012, which claims priority to U.S. Provisional Application No. 61/481,082 filed on Apr. 29, 2011, and PCT International Application No. PCT/KR2012/003274 filed on Apr. 27, 2012. The entire contents of all of the above applications are hereby incorporated by reference.

BACKGROUND OF THE INVENTION

1. Field of the Invention

The technical features of this document relate to wireless communications, and more particularly, to a method for processing data associated with bearer resources in a wireless network.

2. Discussion of the Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

The 3GPP LTE system provides session management and mobility management procedures to alleviate the congestion of the network. When performing the session management or mobility management, the network may provide back-off timers to control further signaling from the UE.

SUMMARY OF THE INVENTION

The technical features of this document provide a method and wireless apparatus for processing data associated with hearer resources, session management, and/or mobility management in a wireless network transmitting a radio signal based on a number of orthogonal frequency division multiplexing (OFDM) symbols. The technical features can be used to improve the performance of the wireless network, and/or to solve the problem caused by the abnormal situation.

In one aspect, the method comprises transmitting, by a user equipment (UE), a first packet data network connectivity request message to a mobility management entity (MME) for establishing a packet data network connection; receiving, by the UE, a radio resource control (RRC) connection reconfiguration message including a packet data network connectivity accept message which is transmitted from the MME; receiving, by the UE, a session management back-off time value from the MME when a request of bearer resource modification or bearer resource allocation for the established packet data network connection is rejected by the MME; starting, by the UE, a session management back-off timer according to the session management back-off time value, the session management back-off timer being associated with the established packet data network connection; receiving, by the UE, a deactivate bearer context request message, from the MME, including a cause code indicating that reactivation is requested and stopping the session management back-off timer if the session management back-off time s running; and transmitting, by the UE, a second packet data network connectivity request message to the MME after stopping the session management back-off timer.

A value of the cause code may be set to '39'.

The session management back-off time value is included in a bearer resource modification reject message which is transmitted from the MME, and the UE does not transmit an additional request for the bearer resource modification while the session management back-off timer is running.

The bearer resource modification reject message includes a cause value which is set to '26', which indicates 'insufficient resources'.

The session management back-off time value is included in a bearer resource allocation reject message which is transmitted from the MME, and the UE does not transmit an additional request for the bearer resource allocation while the session management back-off timer is running.

The bearer resource allocation reject message includes a cause value which is set to '26', which indicates 'insufficient resources'.

The first packet data network connectivity request message and the second packet data network connectivity request message are associated with a same access point name (APN).

The deactivate bearer context request message identifies a bearer context to be deactivated by the UE, and the second packet data network connectivity request message is associated with a same access point name (APN) as the deactivated bearer context.

The cause code included in the deactivate bearer context request message indicates that reactivation of a packet data network connectivity is requested for a same access point name (APN) as a bearer context which is deactivated by the deactivate bearer context request message.

In another aspect, a user equipment (UE) is further provided. The comprises a radio frequency (RF) unit configured for: transmitting a first packet data network connectivity request message to a mobility management entity (MME) for establishing a packet data network connection; receiving a radio resource control (RRC) connection reconfiguration message including a packet data network connectivity accept message which is transmitted from the MME; receiving a session management back-off time value from the MME when a request of bearer resource modification or bearer resource allocation for the established packet data network connection is rejected by the MME; starting a session management back-off timer according to the session management back-off time value, the session management back-off timer being associated with the established packet data network connection; receiving a deactivate bearer context request message, from the MME, including a cause code indicating that reactivation is requested and stopping the session management back-off timer if the session management back-off timer is running; and transmitting a second packet data network connectivity request message to the MME after stopping the session management back-off timer.

In another aspect, a method of communicating data in a wireless communication system including a first type network communicating based on a number of orthogonal frequency division multiplexing (OFDM) symbols, a second type network which is different from the first type network, and a user equipment (UE) which is communicating with at least one of the first type network and the second type network, the method performed by the UE which moves between a coverage of the first type network and a coverage of the second type network is further provided. The method includes receiving a UE location registration accept message indicating that an idle mode signaling reduction (ISR) function is enabled; transmitting a first control message to activate or modify a packet data protocol (PDP) context to the second type network; receiving a second control message including an mobility management back-off time value; staring an mobility management back-off timer based on the mobility management back-off time value; receiving a paging message while the mobility management back-off timer is running, wherein the paging message is transmitted from the first type network by using a system architecture evolution temporary mobile subscriber identity (S-TMSI); and transmitting, in response to the paging message, a first tracking area update (TAU) request message to the first type network, wherein the UE's temporary identity (TIN) used in next update indicates a packet temporary mobile subscriber identity (P-TMSI).

DETAILED DESCRIPTION OF THE INVENTION

The technology described below can be used in various wireless communication systems such as code division multiple access (CDMA), a frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink. For clarity of explanation, the following description will focus on the 3GPP LTE (or the 3GPP LTE-A). However, the technical features of this description are not limited thereto.

Figure 1:
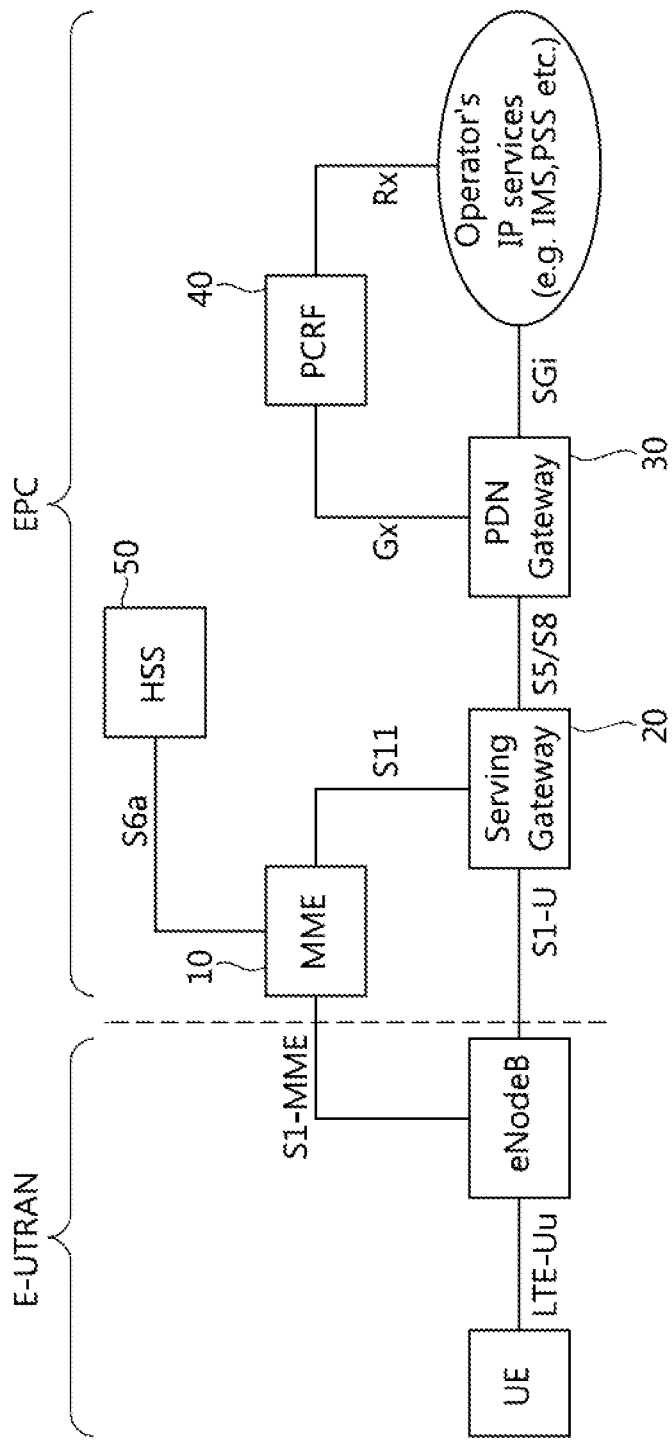
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the LTE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the LT moves between eNodeBs. All user IP packets are transferred through the S-GW 20. The S-GW 20 also retains information about the bearers when the UE is in an idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation tier the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
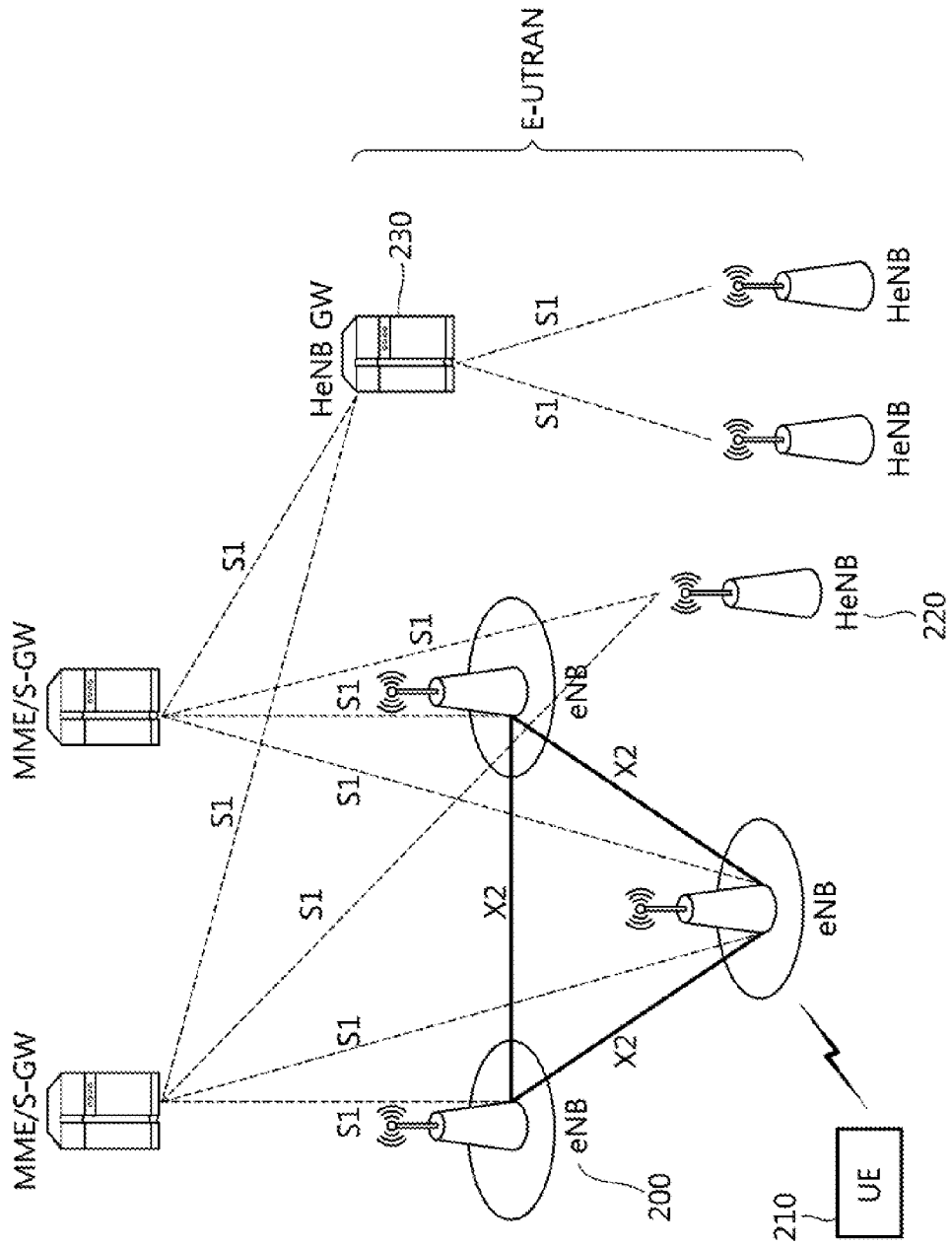
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT(mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the SI interface to the aforementioned EPC (Evolved Packet Core) elements, more specifically to the Mobility Management Entity (MME) by means of the SI -MME and to the Serving Gateway (S-GW) by means of the S1-U.

The E-TURAN architecture depicted in FIG. 2 may further comprise a Home evolved Node B (HleNB) 220 and an HeNB GW (HeNB gateway) 230.

The HeNB 220 is fundamentally similar to a typical eNB, but it can be simple devices typically installed by end users themselves. The HeNB 220 is also referred to as an HNB (home NB), a femto cell, a home cellular base station, etc, The HeNB 220 behaves like a cellular network with respect to communication devices, which can use their regular cellular network radio interface to communicate with them, and connects to a cellular network operator's core network through the alternate network access, such as Internet access via fiber, IDSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a femto cell in contrast to a macro cell provided by the eNB 200 from a standpoint of the service coverage.

Hereinafter, the concept of an APN (Access Point Name) will be explained.

The APN is the name of an access point previously defined within a network to find a P-GW when a requested service is passed through the P-GW to access a network. The APN is provided to the UE, and the IJE determines a suitable P-GW for data transmission and reception based on the APN.

The APN can be a configurable network identifier used by a mobile device when connecting to a carrier. The carrier will then examine this identifier to determine what type of network connection should be created, for example: what IP addresses should be assigned to the wireless device, what security methods should be used, and how/or if, it should be connected to some private customer network. More specifically, the APN identifies an IP Packet Data Network (PDN), that a mobile data user wants to communicate with. In addition to identifying the PDN, the APN may also be used to define the type of service. The APN is used in various access networks such as a general packet radio service (GPRS) and an evolved packet core (EPC).

Hereinafter, the concept of an EPS bearer will be explained.

The EPS (Evolved Packet System) uses the concept of EPS bearers to route IP traffic from a gateway in the PDN (pack data network) to the LTE. The EPS bearer is an IP packet flow with a Quality of Service (QoS) between the gateway and the UE. The E-UTRAN and EPC (Evolved Packet Core) together set up and release EPS bearers as required by applications.

The EPS bearer is typically associated with the QoS. Multiple bearers can be established for a user in order to provide different QoS streams or connectivity to different PDNs. For example, a user might be engaged in a voice (e.g., VoIP) call while at the same time performing web browsing or File Transfer Protocol (FTP) download. A VoIP bearer would provide the necessary QoS for the voice call, while a best-effort bearer would be suitable for the web browsing or FTP session.

Broadly, EPS bearers can be classified into two categories based on the nature of the QoS they provide. The two categories are Minimum Guaranteed Bit Rate (GBR) bearers and Non-GBR bearers. The GBR bearers have an associated GBR value for which dedicated transmission resources are permanently allocated at bearer establishment/modification. Bit rates higher than the GBR may be allowed for a GBR bearer if resources are available. On the other hand, the non-GBR bearers do not guarantee any particular bit rate. For these bearers, no bandwidth resources are allocated permanently to the bearer.

Further, EPS bearers can be classified in a different manner. In particular, the EPS bearers can be classified into a default bearer and a dedicated bearer. The default bearer is an EPS bearer which is first established for a new PDN connection, and remains established throughout the lifetime of the PDN connection. The default bearer gets established with every new PDN connection. Namely, when the UE connects to the P-GW by means of a procedure called "Initial Attach," a new or default bearer is created and its context remains established throughout the lifetime of that PDN connection. The UE can be attached to more than one P-GW, and thus the UE can have More than one default bearer. The default EPS bearer is a non-GBR bearer and associated with a best effort QoS, wherein the best effort QoS is the lowest of all QoS traffic classes. Bearers which are not created at the initial attach procedure can be referred to as dedicated bearers. The dedicated bearer is an EPS bearer that is associated with uplink packet filters in the UE and downlink packet filters in the PDN GW where the filters only match certain packets.

Hereinafter, the relationship of the EPS bearer and lower ayer bearers such as S1, S5/S8, radio bearers and E-RAB will be explained.

Figure 3:
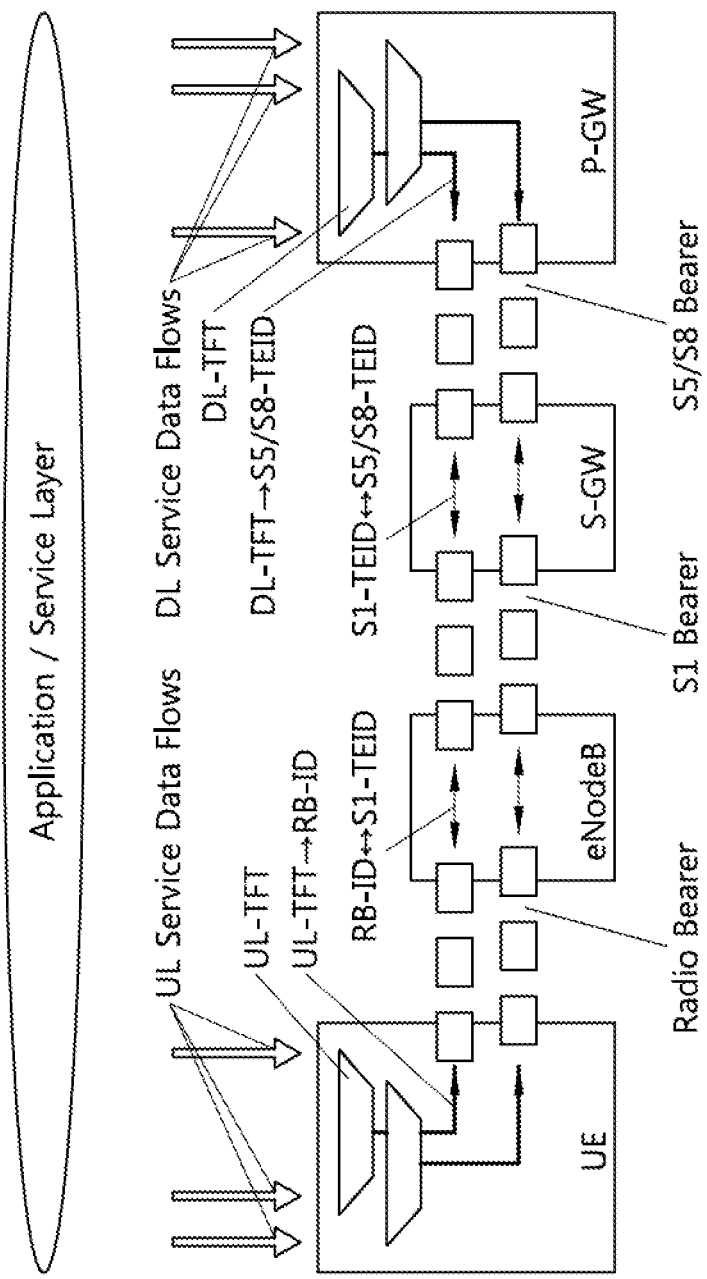
FIG. 3 is a view illustrating EPS bearers crossing multiple interfaces.

The EPS bearer has to cross multiple interfaces as shown in FIG. 3—the S5/S8 interface from the P-GW to the S-GW, the SI interface from the S-GW to the eNodeB, and the radio interface (also known as the LTE-Uu interface) from the eNodeB to the UE. Across each interface, the EPS bearer is mapped onto a lower layer hearer, each with its own bearer identity. Each node keeps track of the binding between the bearer IDs across its different interfaces.

An S5/S8 bearer transports the packets of the EPS bearer between the P-GW and the S-GW. The S-GW stores a one-to-one mapping between an Si bearer and an S5/S8 bearer. Each bearer is identified by the GTP (GPRS Tunneling Protocol) based Tunnel Endpoint ID (also known as a TEID) across both interfaces.

An S5/S8 bearer transports the packets of an EPS bearer between the S-GW and the eNodeB. A radio bearer (also known as a radio data bearer) transports the packets of an EPS bearer between the UP and the eNodeB. Each bearer is identified by the GTP (GPRS Tunneling Protocol) tunnel endpoint ID (also known as a TEID or a GTP TEID) across both interfaces.

Further, the concept of the E-RAB (E-UTRAN Radio Access Bearer) may be used. An E-RAB transports the packets of an EPS bearer between the UE and the EPC (GPRS Tunneling Protocol), more specifically to the S-GW through eNB. When an E-RAB exists, there is a one-to-one mapping between this E-RAB and an EPS bearer.

IP packets mapped to the same EPS bearer receive the same bearer-level packet forwarding treatment (e.g., scheduling policy, queue management policy, rate shaping or RLC configuration). Providing different bearer-level QoS thus requires that a separate EPS bearer is established for each QoS flow, and user IP packets must be filtered into the different EPS bearers.

Hereinafter, the concept of mobility management (MM) and a mobility management (MM) back-off timer is explained in detail. All UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in UE registered tracking area(s) (TA). Thereafter, eNBs start to page the UE over the radio interface. On receipt of a paging message, the UE performs a certain procedure which results in changing the UE to ECM.-CONNECTED state. This procedure is called a 'Service Request Procedure'. UE-related information is thereby created in the E-UTRAN, and the bearers are re-established. Tie MME is responsible for the re-establishment of the radio bearers and updating the UE context in the eNodeB.

When the above-explained mobility management (MM) is applied, a mobility management (MM) back-off timer can be further used. Upon receipt of a time value associated with the MM back-off timer, the UE may activate the MM back-off timer according to the time value given by the network. Under the current 3GPP specification, while the MM back-off timer is running, UE is prohibited from performing the Tracking Area Update or Routing Area Update to the network. However, even when the MM back-off timer is running, the UE can receive page message and be thereby paged, if the network has downlink data for the UE. As explained above, when the UE responding the page message, the Service Request Procedure is required under the current 3GPP specification.

Hereinafter, the concept of session management (SM) and a session management (SM) back-off timer is explained in detail. The session management (SM) is related to session management (SM) signaling which can be used for establishing PDN connectivity, allocating an additional bearer or modifying a QoS of a certain bearer. For example, when the new service (e.g., vow service is initiated, the UE may request the network to allocate a new bearer by using the SM signaling. Further, the UE may request to change a QoS of a certain bearer by using the SM signaling. The SM signaling can be initiated by EPS Session Management (ESM) requests from the UE (e.g., PDN Connectivity, Bearer Resource Allocation, or Bearer Resource Modification Requests).

Under the current 3GPP specification, APN-based Session Management (SM) congestion control can be applied. In particular, the MME may reject the EPS Session Management (ESM) requests from the UP with a certain back-off timer when ESM congestion associated with the APN is detected. The above-mentioned timer can be referred to as a 'Session Management (SM) back-off timer'. In the current specification, the SM back-off time can be referred to as another terminology such as T3396 value, etc.

The MME may store a Session Management back-off time (or SM back-off time value) when congestion control is active for an APN. The MME may immediately reject any subsequent request from the UE targeting to the APN before the stored SM back-off timer is expired.

The SM back-off time (or time value) is transmitted from the MME to the UE when the network (e.g., MME) rejects the EPS Session Management (ESM) requests. For example, the SM back-off time value can be transmitted to the UP when a request for bearer resource modification or bearer resource allocation is rejected by the MME. In particular, the SM back-off time value may be transmitted to the UP via a BEARER RESOURCE ALLOCATION REJECT message and/or BEARER RESOURCE MODIFICATION REJECT message.

Upon reception of the SM back-off time value in the EPS Session Management reject message, the UE activates an SM back-off timer according to the received SM back-off time value. In particular, if APN is provided in the rejected EPS Session Management Request message, the UE may not initiate any Session Management procedures for the congested APN (e.g., sending PDN CONNECTIVITY REQUEST, BEARER RESOURCE MODIFICATION REQUEST or BEARER RESOURCE ALLOCATION REQUEST) except for releasing the PDN connection (e.g. sending PDN Disconnection Request). The UE may initiate Session Management procedures for other APNs. If APN is not provided in the rejected EPS Session Management Request message, the UE may not initiate any Session Management requests without APN. Further, the UE may initiate Session Management procedures for specific APN. The UE can support a separate SM back-off timer for every APN that the UE may activate.

The technical features in this description comprise a number of embodiments related to mobility and session management. Hereinafter, the first embodiment which is related to network-ordered re-attach or PDN connection reactivation while the MM or SM timer is running is explained in detail.

As mentioned above, the UE may receive from the MME an SM back-off time value which is associated with an established PDN connection, when the network has previously rejected bearer allocation or modification request for the already established PDN connection. Namely, the SM back-off time value can be included .in BEARER RESOURCE ALLOCATION REJECT message and/or BEARER RESOURCE MODIFICATION REJECT message. Further, under the current 3GPP specification, when the network previously rejected MM signaling form UE, the UE is not allow to perform mobility management (MM) procedures while the MM back-off timer is running.

In sum, under the current 3GPP specification, the UE is not allowed to request the activation, allocation or modification of a bearer while the SM back-off timer is running. Further, under the current specification, the UE is not allowed to re-attach to the network while the MM back-off timer is running.

However, there may occur an abnormal situation where the network requests re-establishment of a PDN connection or re-attachment to the network while the SM/MM back-off timers are running. For example, a congested network may want to use Selected IP Traffic Offload (SIPTO), which allows data traffic to flow to and from an alternative gateway bypassing the existing congested gateways in the operator's core network in order to alleviate such congestion. in particular, the network may send a DEACTIVATE EPS BEARER CONTEXT REQUEST message with an ESM cause code '39' indicating 'reactivation requested', or a DETACH REQUEST message with a detach type indicating 're-attach required'. Upon receiving such messages, the UE performs PDN connection deactivation or detach. However, once the deactivation or detach is performed, the UE cannot signal the network for re-establishment or re-attachment, since it is prohibited while the SM/MM back-off timers are running.

In order to resolve such problems, the following description provides technical features of for network-ordered PDN connection re-activation or re-reattachment.

Figure 4:
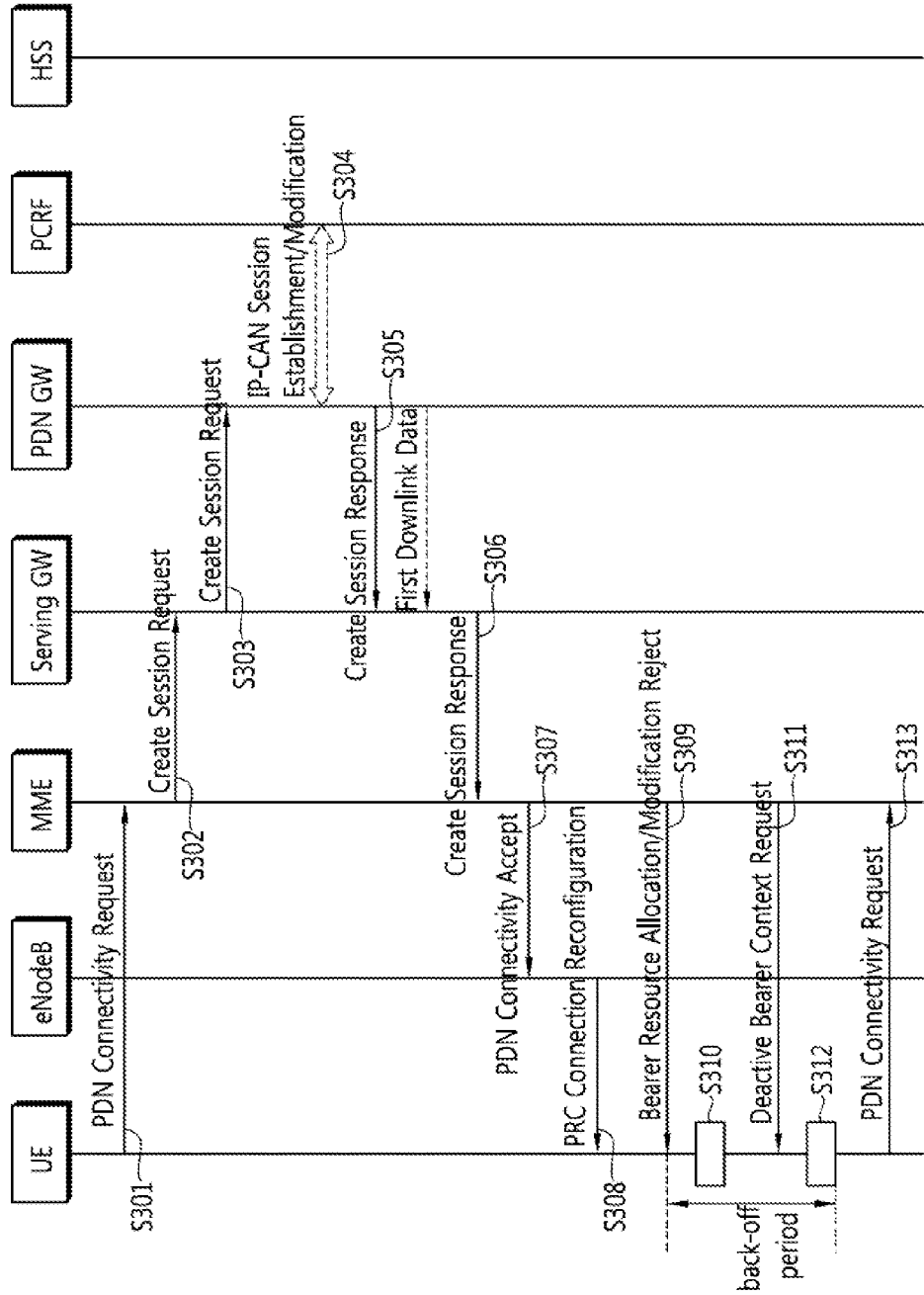
FIG. 4 is a flowchart illustrating a method of handling data for network-ordered PDN connection re-activation during the SM timer running.

FIG. 4 is a flowchart illustrating a method of handling data for network-ordered PDN connection re-activation during the SM timer running. According to an example of FIG. 4, the UE stops at least the SM back-off timer, if running, of affected PDN connection(s) after receiving the DEACTIVATE EPS BEARER CONTEXT REQUEST message with an ESM cause code '#39' indicating 'reactivation requested'.

In step S301, to establish a PDN connection, the UE transmits a PDN connection request message (i.e., PDN Connectivity Request) to the MME via the eNB. The PDN Connectivity Request includes information on an APN (Access Point Name), a PDN Type, Protocol Configuration Options, a Request Type, or the like. The PDN type indicates the requested IP version (IPv4, iPv4v6, IPv6). The Protocol Configuration Options (PCOs) are used to transfer parameters between the UE and the PDN GW, and are sent transparently through the MME and the Serving GW. The Request Type indicates types (e.g., emergency, initial request, handover) of connections.

In step S302, the MME allocates a bearer ID and transmits a session request message (i.e., the Create Session Request) to the S-GW.

In steps S303 to S805, a Create Session Request and a Create Session Response are delivered between the S-GW and the L-GW to create a session for the PDN connection.

In step S306, a session response message (i.e., the Create Session Response) is transmitted from the S-GW in response to the Create Session Request.

In step S307, the MME transmits a PDN Connectivity Accept (APN, PDN Type, PDN Address, EPS Bearer Id, Session Management Request, Protocol Configuration Options) message to the eNodeB.

In step S308, the eNodeB transmits a radio resource control (RRC) connection reconfiguration message, which includes the PDN Connectivity Accept. By performing steps S301 to S308, a PDN connection is established for a certain APN.

After a PDN connection is established, bearer resource allocation/modification procedures may be performed. The UE may transmit a BEARER RESOURCE ALLOCATION REQUEST message to the MME to request the allocation of bearer resources, or a BEARER RESOURCE MODIFICATION REQUEST message to the MME to request the modification of bearer resources. The detailed features related to the BEARER RESOURCE ALLOCATION REQUEST message are disclosed in Sections 6.5.3.2 to 6.5.3.4 of 3GPP TS 24.301 V10.0.0 (2010-09) "Non-Access-Stratum (NAS) protocol for Evolved Packet System (EPS); Stage 3(Release 10)," which are incorporated by reference in their entirety herein. Further, the detailed features related to the BEARER RESOURCE MODIFICATION REQUEST message are disclosed in Sections 6.5.4.2 to 6.5.4.4 of 3GPP TS 24.301 V10.0.0 (2010-09) "Non-Access-Stratum (NAS) protocol for Evolved Packet System (EPS); Stage 3(Release 10)," which e incorporated by reference in their entirety herein.

If the bearer resource allocation request is rejected by the network, the MIME transmits BEARER RESOURCE ALLOCATION REJECT to the UE (S309). The BEARER RESOURCE ALLOCATION REJECT message includes an SM back-off time value which is associated with a PDN connection which is established by steps S301 to S308. The BEARER RESOURCE ALLOCATION REJECT message further includes a cause code which indicates the reason why a session management (SM) request (i.e, BEARER RESOURCE ALLOCATION REQUEST) is rejected.

A value of cause code included in the BEARER RESOURCE ALLOCATION/MODIFICATION REJECT can be set to '26' which indicates insufficient resource when the network reject the bearer resource allocation/modification request.

Upon reception of the SM back-off time value in the session management (SM) reject message, the UE activates an SM back-off timer according to the received SM back-off time value (S310). In particular, if the APN is provided in the rejected session management (SM) request message, the UE may not initiate any session management procedures for the APN (e.g., sending BEARER RESOURCE MODIFICATION REQUEST or BEARER RESOURCE ALLOCATION REQUEST) while the SM back-off timer is running.

After the SM back-off time is activated, as discussed above, the network may request re-establishment of a PDN connection (S311) for performing SIPTO functions. For instance, the network may transmit a DEACTIVATE EPS BEARER CONTEXT REQUEST message with a cause code '39' indicating 'reactivation requested', thereby requesting to re-establish the PDN connection of the UE. Upon receiving such a message, the UE performs deactivation of the default EPS bearer context, stops the session management (SM) back-off timer, if running, (S312) and thereby re-initiates a PDN connectivity request for the same APN as the deactivated default EPS bearer context (S313). Since the UE stops the session management (SM) back-off timer when the reactivation is requested, the UE can further initiate session management (SM) procedures (i.e., transmitting PDN CONNECTIVITY REQUEST) for the congested APN.

Alternatively, the features of FIG. 4 can be applied to handling the MM back-off timer. Namely, UE can stop the SM back-off timer, if running, of the affected PDN connection(s), and further stop the MM back-off timer, if running, after receiving a DETACH REQUEST MESSAGE with a detach type indicating 're-attach required'.

Hereinafter, additional features related to re-activation/re-attachment procedures are further provided. If the re-activation/re-attachment is performed by a UE in an idle state, the current 3GPP specification requires a low priority UE to identify itself as 'delay tolerant' in RRC establishment cause. This may lead to a radio access network rejecting the RRC connection of the UE for re-activation or re-attachment.

To solve the above-mentioned problem, the low priority UE may identify itself as a normal priority UE (e.g. via RRC establishment cause) to the radio access network entity when initiating RRC connection for re-attachment or re-activation of the PDN connection.

Hereinafter, the second embodiment which is related to receiving a paging message while the MM back-off timer is running. The second embodiment is also related to an idle mode signaling reduction (ISR) function, which allows the UE to remain simultaneous registered in an UTRAN/GE- RAN Routing Area (RA) and an E-UTRAN Tracking Area (TA) list. This allows the UE to make cell reselections between E-UTRAN and UTRAN/GERAN without a need to send additional TAU or RAU request, as long as it remains within the registered RA and TA list. Consequently, the ISR function is one of features that reduce the mobility signaling and improve the battery life of UEs.

In the meantime, under the current 3GPP specification, when the network pages the UE, the UE is required to perform the above-explained service request procedure. However, this may lead to abnormal situations which are as described in the followings, if the above-mentioned Tracking Area Update (TAU) is not performed.

Figure 5:
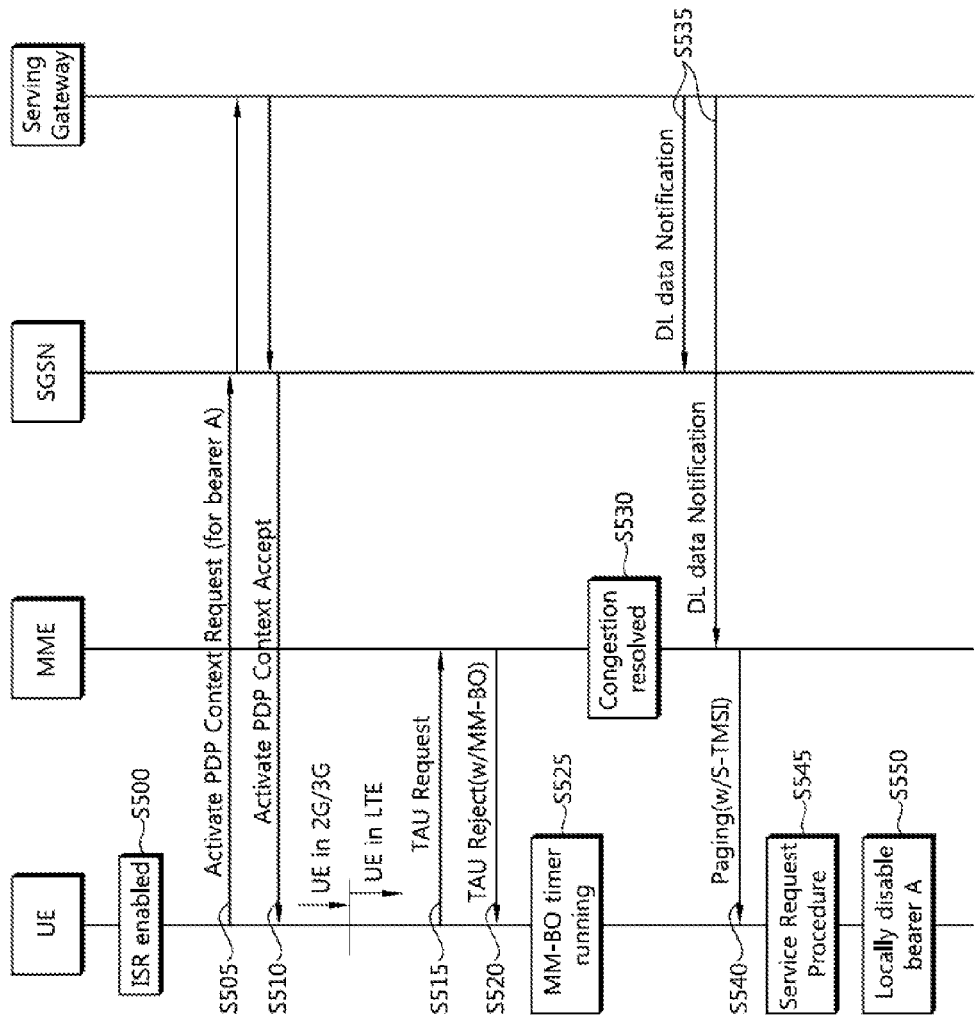
FIG. 5 is a flowchart illustrating a technical problem which may occur when the service request procedure is performed.

FIG. 5 is a flowchart illustrating a technical problem which may occur when the service request procedure is performed.

Referring to FIG. 5, in step S500, the ISR function is enabled with respect to the UE. In particular, the ISR function can be enabled by receiving a UE location registration accept message (e.g., TAU or RAU accept message).

In step S505, the UE can transmit a request for activating a packet data protocol (PDP) context for a bearer 'A'. Alternatively, the UE may transmit a request for modifying a packet data protocol (PDP) context. After the request is transmitted to a 2G/3G network entity(e.g., Serving GPRS Support Node; SGSN), the bearer 'A' can be established, as shown in step S510. The PDP context used In 2G/3G network is corresponding to the above-explained EPS bearers. In particular, the PDP context offers a packet data connection over which the UE and the network can exchange IP packets. Usage of these packet data connections can be restricted to specific services.

When using the ISR, the UE holds a TIN (Temporary Identity used in Next update), which a parameter indicating which type of mobility management context shall be used in the next signaling with the core network, which can be TAU (or RAU). Possible values of TIN include 'GUTI' (UE's identification known to the MME), 'P-TMSI' (UE's identification known to the SGSN) and 'RAT related TMSI'. For instance, in a situation where the TIN is set to 'GUTI (Globally Unique Temporary Identity)', the SGSN can fetch the UE's context from the MME by receiving a RAU request with the GUT1. While the GUTI is not a native identification to the SGSN, context exchange can be performed by using the GUTI.

Under the current standard, UE's TIN is set to the P-TMSJ (packet temporary mobile subscriber identity) when the UE reselects to E-UTRAN (e.g. due to bearer configuration modifications performed on GERAN/UTRAN). In particular, when the PDP context is modified while LTE is in 2G or 3G and with ISR enabled, the UE can change its TIN to the P-TMSI in a certain situation to locally disable the TSR. Further, when the PDP context is activated and the UE moves from 2G (or 3G) network to the E-UTRAN (i.e., LTE) while ISR is enabled, the UE can change its TIN to the P-TMSI in a certain situation to locally disable the ISR.

If the UE moves to an area covered by the LTE system, it may disable the ISR function locally and performs a TAU procedure. In particular, the UE transmits a TAU request to the MME for updating TA (S515).

In step S520, if congestion occurs in the CN, an MM back-off time value can be included in a TAU reject which is transmitted in response to the TAU request. Upon receiving the MM back-off time value, an MM back-off timer is initiated according to the received MM back-off time value. The UE changes its state to EMM-REGISTERED.ATTEMPT-ING-TO-UPDATE. Alternatively, the MM back-off time value can be received before the UE moves into the coverage of LTE, or during a TAU procedure.

Once the core network congestion is resolved (S530), the S-GW may transmit DL data notification to the SGSN and the MME (S535). With the ISR, the UE is registered to both systems, ITE and 2G/3G and paging will be distributed to both. Namely, the UE receives a paging from the MME, as depicted in S540. For paging purposes, the mobile is paged with the S-TMSI. The S-TMSI can be constructed from the Mobility Management Entity Code (MMEC) and the M-TMSI (32-digit binary number that is part of the GUTI). The S-TMSI is a shorter format of GUTI and uniquely identifies the UE within an MME group. Further, the S-TMSI can be used after successful registration of a UE.

Under the current standard, when a paging with the S-TMSI is received while the MM back-off timer is running, the UE stops the MM back-off timer. Further, in response to the paging with the S-TMSI, the UE performs the above-explained service request procedure (S545). In this situation, the MME does not have the UE's most up-to-date bearer context, and thus the bearer 'A' may not be established. Eventually, the UE may locally disable the bearer 'A'.

In sum, a new bearer/packet data protocol (PDP) context can be established when the UE in which the ISR is activated stays at 2G/3G radio access network (S500-S510). If the UE moves to an area covered by LTE system, the UE disables ISR locally and performs the TAU (S515). Thereafter, the MME may reject the TAU request due to core network congestion with the MM back-off time value (S520-S525). After congestion is resolved, a paging can be transmitted to the UE, and the UE responds to the paging with service request procedure (S530-545). In this case, the new bearer may not be established by the eNB when U-Plane bearers are setup, because MME does not have the UE's most up-to-date bearer context (S550). Accordingly, the data cannot be delivered to the UE.

Figure 6:
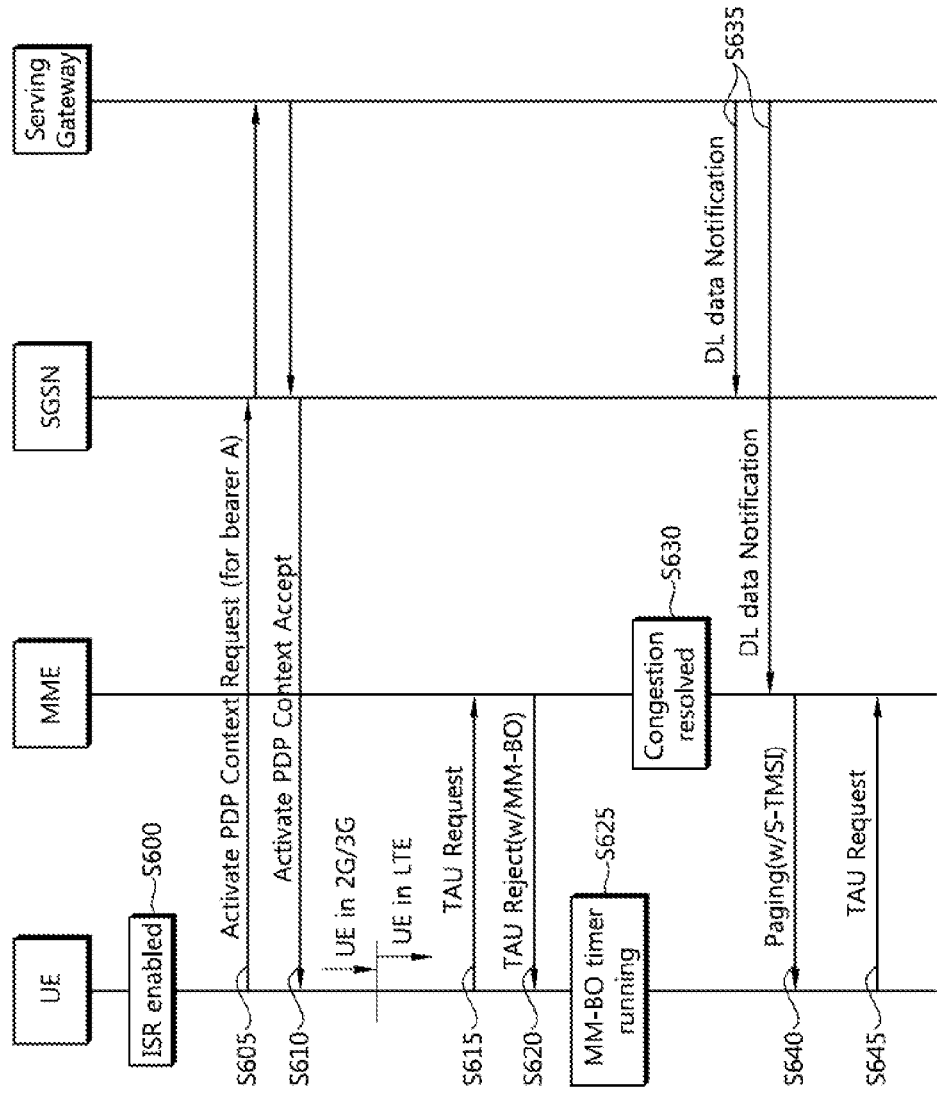
FIG. 6 is a flowchart illustrating a method of communicating data in a wireless communication system including 2G/3G and LTE.

FIG. 6 is a flowchart illustrating a method of communicating data in a wireless communication system including 2G/3G and LTE.

Referring to FIG. 6, a new bearer/packet data protocol (PDP) context can be established when the UE in which the ISR is activated stays at 2G/3G radio access network (S600-S10). If the UE moves to an area covered by LTE system, the UE disables ISR locally and performs the TAU (S615). Thereafter, the MME may reject the TAU request due to core network congestion with the MM back-off time value (S620-S625). After congestion is resolved, a paging can be transmitted to the UE, and the UE responds to the paging with the TAU procedure (S630-645). In particular, the UE transmit a TAU request in which the UE's TIN indicates the P-TMSI (S645). In this case, the new bearer may be established by the eNB when U-Plane bearers are setup, because MME can have the UE's most up-to-date bearer context by fetching the UE's context from the SGSN. In sum, the example of FIG. 6 allows the UE to perform the TAU procedure for responding to the paging, instead, such that the MME would fetch the up-to-date bearer context from the SGSN and instruct the eNB to setup a new radio bearer for the incoming data.

In one design, it is preferred that the UE should perform the TAU/RAU instead of service request procedure, with the active flag set, to respond to page, if the TAU/RAU is needed for the core network to update the UE context. If the page is due to a mobile terminated circuit switched fallback (MT CSFB), an extended service request message is sent after the completion of the TAU procedure.

Further, as explained above, under the current 3GPP specification, a low priority UE is required to use a "delay tolerant" in RRC establishment cause, unless there is an emergency PDN connection, to initiate the TAU/RAU procedure from an idle state. This leads to the radio access network rejecting the RRC connection because the core network indicating congestion and RRC cause value indicating the UE as low priority.

Therefore, it is preferred that the low priority UE should identify itself as a normal priority UE (e.g. via RRC establishment cause) to a radio access network entity when initiating the TAU/RAU procedure due to receiving page.

Hereinafter, the third embodiment which is related to handling the MM back-off timer when performing inter-RAT handover.

Figure 7:
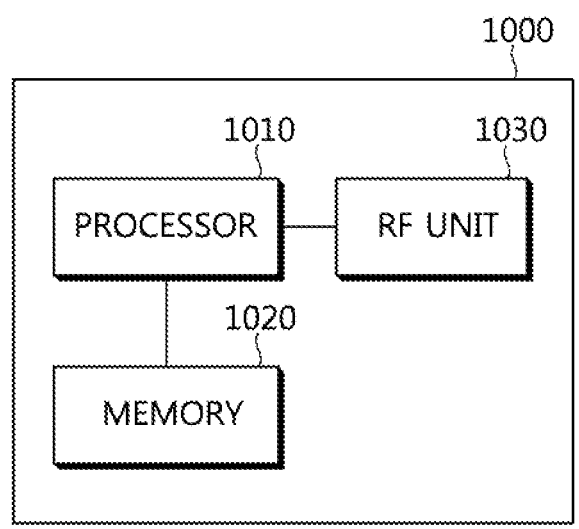
FIG. 7 is a block diagram showing a wireless apparatus to implement technical features of this description.

FIG. 7 is a block diagram showing a wireless apparatus to implement technical features of this description. This may he a part of a UE, or core network (CN) entity. The wireless apparatus 1000 may include a processor 1010, a memory 1020 and a radio frequency (RE) unit 1030.

The processor 1010 may be configured to implement proposed functions, procedures and/or methods described in this description. Layers of the radio interface protocol may be implemented in the processor 1010. The processor 1010 may handle a MM or SM back-off timer. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of processing data in a communication system, the method comprising:
  establishing, by a user equipment (UE), a data connection associated with an access point name (APN);
  if the UE receives a deactivate bearer context request message indicating that reactivation is requested, stopping a session management back-off timer associated with the established data connection if the session management back-off timer is running, wherein the session management back-off timer is a timer starting if a session management back-off time value is received at the UE, and wherein the session management back-off time value is included in a reject message of a request for bearer resource modification or in a reject message of a request for bearer resource allocation; and
  re-initiating, by the UE, the data connection associated with the APN after stopping the session management back-off timer.

2. The method of claim 1, wherein the deactivate bearer context request message includes a cause value set to '39', which indicates the reactivation is requested.

3. The method of claim 1, wherein the session management back-off time value is included in a bearer resource modification reject message, and the UE does not transmit an additional request for the bearer resource modification while the session management back-off timer is running.

4. The method of claim 3, wherein the bearer resource modification reject message includes a cause value which is set to '26', which indicates 'insufficient resources'.

5. The method of claim 1, wherein the session management back-off time value is included in a bearer resource allocation reject message, and the UE does not transmit an additional request for the bearer resource allocation while the session management back-off timer is running.

6. The method of claim 5, wherein the bearer resource allocation reject message includes a cause value which is set to '26', which indicates 'insufficient resources'.

7. A user equipment (UE) in a communication system, comprising:
  a radio frequency unit; and
  a processor coupled to the radio frequency unit and configured to:
  establish a data connection associated with an access point name (APN),
  if the UE receives a deactivate bearer context request message indicating that reactivation is requested, stop a session management back-off timer associated with the established data connection if the session management back-off timer is running, wherein the session management back-off timer is a timer starting if a session management back-off time value is received at the UE, and wherein the session management back-off time value is included in a reject message of a request for bearer resource modification or in a reject message of a request for bearer resource allocation, and
  re-initiate the data connection associated with the APN after stopping the session management back-off timer.

8. The user equipment of claim 7, wherein the deactivate bearer context request message includes a cause value set to '39', which indicates the reactivation is requested.

9. The user equipment of claim 7, wherein the session management back-off time value is included in a bearer resource modification reject message, and the UE does not transmit an additional request for the bearer resource modification while the session management back-off timer is running.

10. The user equipment of claim 9, wherein the bearer resource modification reject message includes a cause value which is set to '26', which indicates 'insufficient resources'.

11. The user equipment of claim 7, wherein the session management back-off time value is included in a bearer resource allocation reject message, and the UE does not transmit an additional request for the bearer resource allocation while the session management back-off timer is running.

12. The user equipment of claim 11, wherein the bearer resource allocation reject message includes a cause value which is set to '26', which indicates 'insufficient resources'.

* * * * *